(12) United States Patent
Woo et al.

(10) Patent No.: US 7,781,627 B2
(45) Date of Patent: Aug. 24, 2010

(54) SYSTEM AND METHOD FOR FORMING GAS HYDRATES

(75) Inventors: Yang-Ho Woo, Busan (KR); Ta-Kwan Woo, Busan (KR)

(73) Assignee: Sungil Co., Ltd. (SIM), Busan (KR)

( * ) Notice: Subject to any disclaimer, the term of this patent is extended or adjusted under 35 U.S.C. 154(b) by 555 days.

(21) Appl. No.: 11/679,705

(22) Filed: Feb. 27, 2007

(65) Prior Publication Data

US 2007/0203374 A1 Aug. 30, 2007

Related U.S. Application Data

(60) Provisional application No. 60/777,716, filed on Feb. 27, 2006.

(30) Foreign Application Priority Data

Mar. 29, 2006 (KR) .................. 10-2006-0028624

(51) Int. Cl.
*C07C 9/00* (2006.01)
*B01J 8/00* (2006.01)
(52) U.S. Cl. .................. 585/15; 422/129; 422/232
(58) Field of Classification Search .............. 585/15
See application file for complete search history.

(56) References Cited

U.S. PATENT DOCUMENTS

| 5,434,330 | A | * | 7/1995 | Hnatow et al. ............ 585/864 |
| 5,841,010 | A | * | 11/1998 | Rabeony et al. ............ 585/3 |
| 6,015,929 | A | * | 1/2000 | Rabeony et al. ............ 585/15 |
| 6,028,234 | A | | 2/2000 | Heinemann et al. |
| 6,180,843 | B1 | | 1/2001 | Heinemann et al. |
| 6,653,516 | B1 | * | 11/2003 | Yoshikawa et al. ............ 585/15 |
| 2004/0143145 | A1 | * | 7/2004 | Servio et al. ............ 585/15 |
| 2004/0176649 | A1 | * | 9/2004 | Takahashi et al. ............ 585/15 |
| 2005/0059846 | A1 | | 3/2005 | Kohda et al. |
| 2005/0261529 | A1 | * | 11/2005 | Crosby et al. ............ 585/15 |
| 2006/0272805 | A1 | * | 12/2006 | O'Malley et al. ........ 166/177.2 |

* cited by examiner

*Primary Examiner*—Ellen M McAvoy
(74) *Attorney, Agent, or Firm*—Portland IP Law LLC

(57) ABSTRACT

A system for forming gas hydrates includes a reactor adapted to receive a hydrate-forming fluid and a reaction fluid and react the hydrate-forming and reaction fluids within a reverse micellar solution to form gas hydrate particles; and a gas hydrate removal system coupled to the reactor, the gas hydrate removal system adapted to receive the gas hydrate particles within the reverse micellar solution and transport the gas hydrate particles away from the reactor. The gas hydrate removal system is adapted to transport gas hydrate particles away from the reactor concurrently with the formation of gas hydrate particles within the reactor.

20 Claims, 5 Drawing Sheets

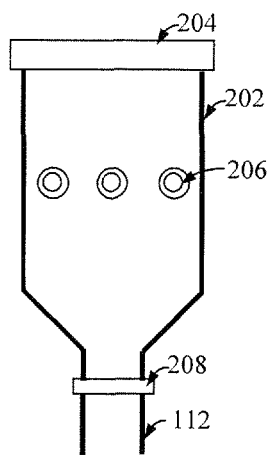
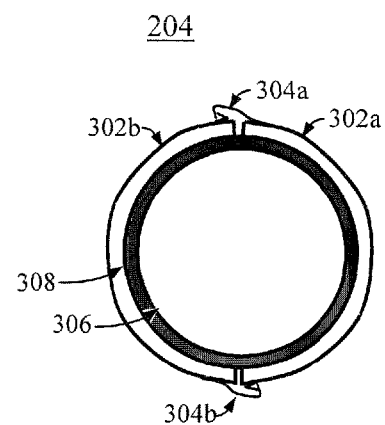
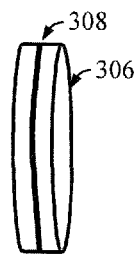
FIG. 2  FIG. 3A  FIG. 3B
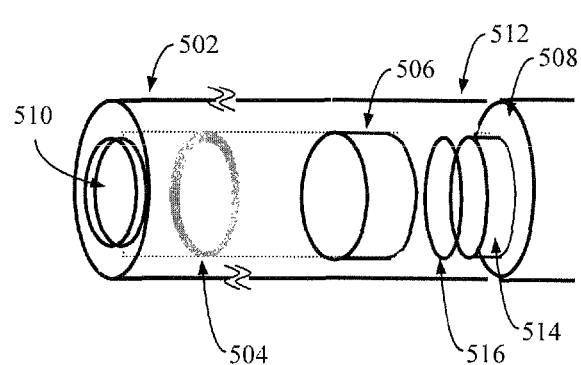
FIG. 5

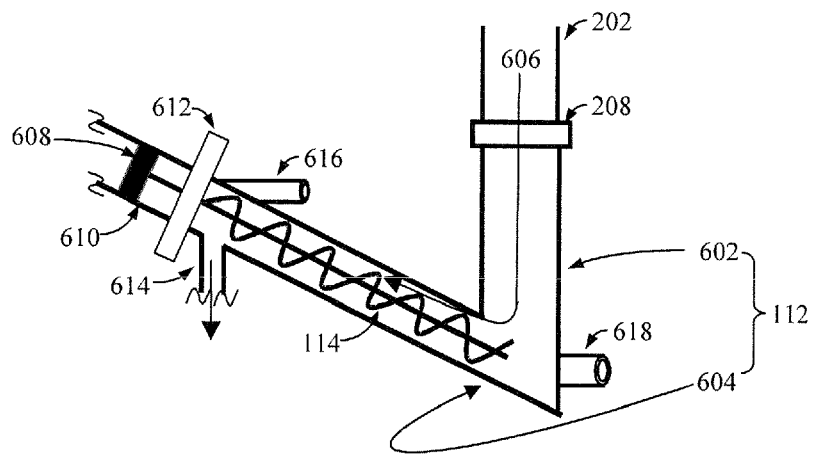
FIG. 6
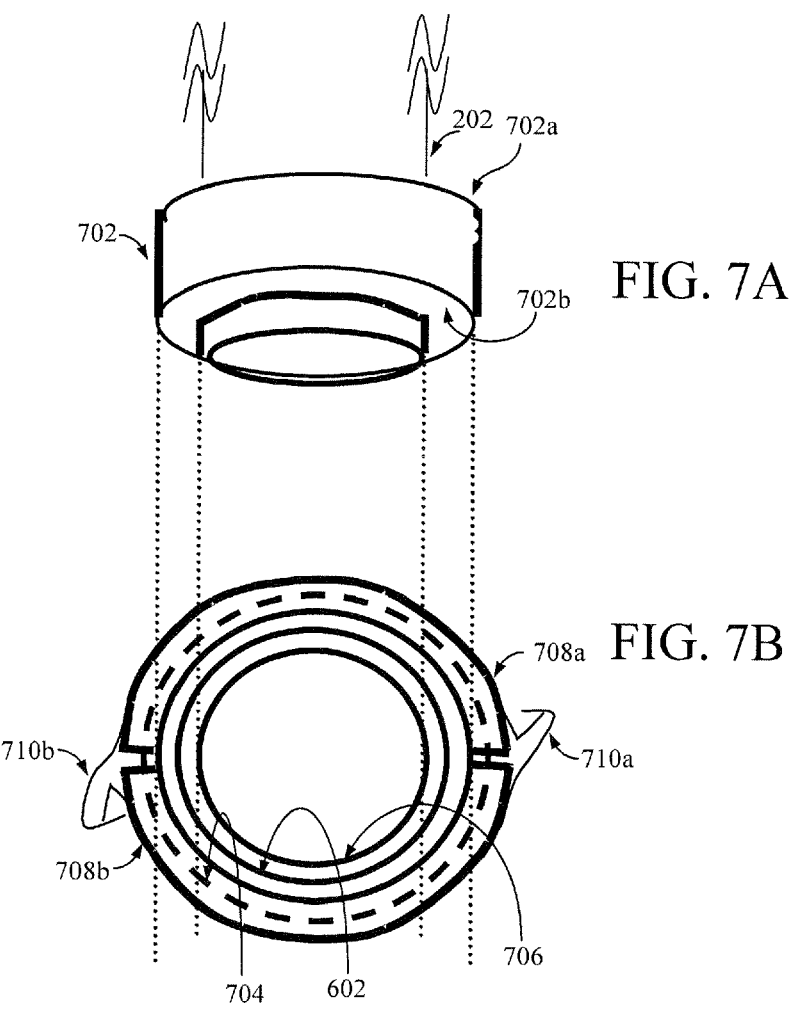
FIG. 7A
FIG. 7B

SYSTEM AND METHOD FOR FORMING GAS HYDRATES

CROSS REFERENCE TO RELATED APPLICATIONS

This application claims the benefit of priority to U.S. Provisional Patent Application No. 60/777,716, filed on Feb. 27, 2006. This application also claims priority of Korean Patent Application No. 2006-0028624 filed on Mar. 29, 2006, the contents of which are incorporated herein by reference in their entirety.

BACKGROUND

1. Field of Invention

Embodiments of the invention exemplarily described herein relate generally to systems and methods for forming gas hydrates and, more specifically, to a system and method of forming gas hydrates wherein gas hydrates are removed from a reactor concurrently with the formation of such gas hydrates within the reactor.

2. Description of the Related Art

Gas hydrates have a non-stoichiometric crystalline structure that consists of low molecular weight gas molecules (i.e. $CH_4$, $C_2H_6$, $CO_2$, etc) and host water molecules. In gas hydrates, gas molecules are encaged within water cavities. Because of this structure, water molecules are called 'host' molecules and gas molecules are called 'guest' molecules. The stoichiometric formula of gas hydrates is Gas $(H_2O)_n$, where n is the hydration number. The hydration number is usually 5 to 8 in a water cavity. The water cavity structure is maintained via hydrogen bonds between water molecules under the guest gas environment. Typically there is van der Waals bonding between a non-polar gas molecule and a host water molecule.

The current reserve of natural gas in hydrate sediments provides a tremendous potential as a future energy source (estimated at $10^4$ giga-tons (Gt) of carbon and this amount exceeding all other fossil fuel deposits (5,000 Gt) on earth). Gas hydrates are known to exist as one of three structures; structure I, structure II, and structure H. Structure I is a body centered cubic structure; these hydrates are generally present in the permafrost region and in deep oceans. Structure II is a diamond lattice formed with the gases that are bigger than ethane and smaller than pentane. Structure H has three different cavities with square, pentagonal and hexagonal faces while structures I and II form two types of cavities; pentagonal dodecahedron (small cavity), tetrakaidecahedron (structure-I large cavity) and hexakaidecahedron (structure-II large cavity).

Gas hydrates were first discovered by Humphry Davy in 1811. In the mid 1930's the importance of gas hydrates was emphasized after Hammerschmidt discovered that gas hydrates were responsible for plugging natural gas process and transportation lines. For a long time, research in the petroleum industry had been focused on avoiding the formation of gas hydrates.

In addition, gas hydrates serve as a good medium for storing and transporting natural gas and hydrogen. Methane hydrates hold more than 160 volumes of methane gas per unit volume of hydrate at a standard state condition (0° C., 1 atm). The high concentration of gas in the hydrates has led researchers to consider intentionally forming these materials for the purpose of storing and transporting natural gases more safely and cost effectively. Many bulk gas hydrate formation processes have been proposed in which aqueous solution and gas are supplied within a reactor and maintained under a temperature and pressure sufficient to induce the formation of gas hydrates within the reactor. After gas hydrates have been formed, the reactor is then shut down and the gas hydrates are removed from the reactor. Removal of gas hydrates from a bulk reactor can be time consuming due both to the kinetically slow processes under which gas hydrates are formed and to the need to shut down the bulk reactor to remove gas hydrates that have been formed. Moreover, gas hydrates are solid, bulky masses which stick to interior surfaces of the reactor and other structures within the reactor (e.g., sensors, blades, etc.) and are difficult to transport. Recognition of these and other problems and limitations of convention hydrate forming systems that provided the impetus for the present invention.

SUMMARY

One embodiment exemplarily described herein can be characterized as a system for forming gas hydrates that includes a first valve adapted to be coupled to a first fluid source containing a hydrate-forming fluid; a second valve adapted to be coupled to a second fluid source containing a reaction fluid; a reactor coupled to the first valve, an interior of the reactor comprising a hydrate-forming region and a hydrate-transfer region, wherein the interior of the reactor is in fluid communication with the first valve; an injector coupled to the second valve and located within the hydrate-forming region of the interior of the reactor; a storage chamber; a conduit coupled between the reactor and the storage chamber, wherein an interior of the conduit is in fluid communication with the hydrate-transfer region of the interior of the reactor; and a moveable surface within the interior of the conduit, wherein the hydrate-forming and hydrate-transfer regions of the interior of the reactor are adapted to retain a liquid solution, the reactor is adapted to dissolve the hydrate-forming fluid within the liquid solution, the injector is adapted to inject the reaction fluid into the liquid solution having the hydrate-forming fluid dissolved therein, and the movable surface is adapted to transfer gas hydrate particles formed according to a reaction of the hydrate-forming fluid and reaction fluid within the liquid solution from the hydrate-transfer region to the storage chamber.

Another embodiment exemplarily described herein can be characterized as a system for forming gas hydrates that includes a reactor adapted to receive a hydrate-forming fluid and a reaction fluid and react the hydrate-forming and reaction fluids within a reverse micellar solution to form gas hydrate particles; and a gas hydrate removal system coupled to the reactor, the gas hydrate removal system adapted to receive the gas hydrate particles within the reverse micellar solution and transport the gas hydrate particles away from the reactor, wherein the gas hydrate removal system is adapted to transport gas hydrate particles away from the reactor concurrently with the formation of gas hydrate particles within the reactor.

Yet another embodiment exemplarily described herein can be characterized as a method of forming gas hydrates that includes forming gas hydrate particles within a reverse micellar solution retained by a reactor; and transporting the gas hydrate particles away from the reactor concurrently while forming of gas hydrate particles.

BRIEF DESCRIPTION OF THE DRAWINGS

FIG. 2 schematically illustrates an exemplary configuration of the reactor shown in FIG. 1;

FIG. 3A schematically illustrates an exemplary configuration of the reactor cover shown in FIG. 2;

FIG. 3B illustrates a perspective view of the reactor cover shown in FIG. 3A;

FIG. 5 schematically illustrates an exemplary configuration of the view window shown in FIG. 2;

FIG. 6 schematically illustrates an exemplary configuration of the conduit and moveable surface shown in FIG. 2, and structures associated therewith;

FIG. 7A schematically illustrates one exemplary configuration of a lower portion of the reactor body adapted to be coupled to the conduit shown in FIGS. 2 and 6; and FIG. 7B schematically illustrates an exemplary manner in which the lower portion of the reactor body is coupled to the conduit.

DETAILED DESCRIPTION OF THE ILLUSTRATED EMBODIMENTS

Figure 1:
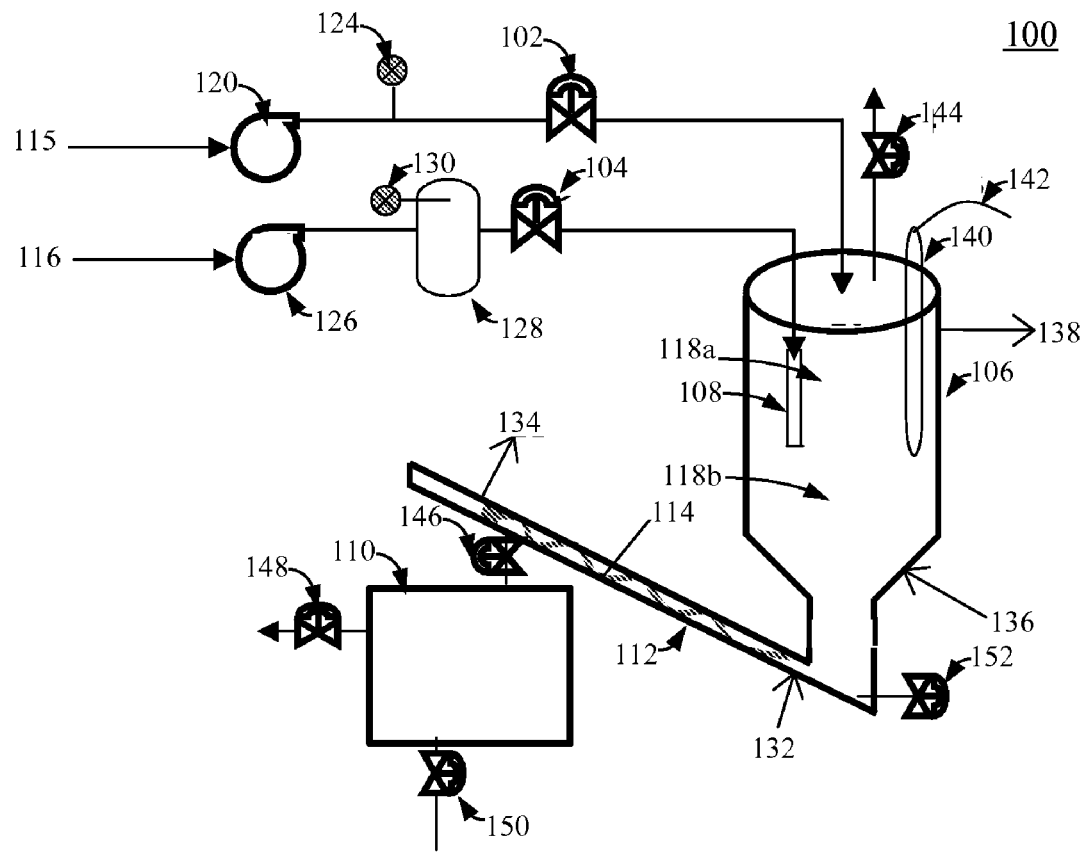
FIG. 1 shows an exemplary embodiment of a system for forming gas hydrates.

FIG. 1 shows an exemplary embodiment of a system for forming gas hydrates.

As shown in FIG. 1, a system 100 for forming gas hydrates includes a first valve 102, a second valve 104, a reactor 106 (e.g., a tapered-boot reactor) coupled to the first valve 102, an injector 108 coupled to the second valve 104, a storage chamber 110, a conduit 112 coupled between the reactor 106 and the storage chamber 110, and a moveable surface 114 within the interior of the conduit 112.

The first valve 102 can be coupled to a first fluid source 115 containing a hydrate-forming fluid (e.g., methane, ethane, natural gas, carbon dioxide, etc.) and the second valve 104 can be coupled to a second fluid source 116 containing a reaction fluid (e.g., diisooctyl sodium sulfosuccinate (AOT) aqueous solution, sodium dodecylsulfate (SDS) aqueous solution, etc.). Further, an interior of the reactor 106 is in fluid communication with the first valve 102 and includes a hydrate forming region 118a and a hydrate-transfer region 118b. The hydrate-forming and hydrate-transfer regions 118a and 118b of the interior of the reactor 106 are adapted to retain a liquid solution that prevents the agglomeration of subsequently formed gas hydrate particles. In one embodiment, the liquid solution may comprise an organic solvent (e.g., iso-octane, etc.). The injector 108 is located within the hydrate-forming region 118a of the interior of the reactor 106 and is coupled to the second valve 104. As shown, an interior of the conduit 112 is in fluid communication with the hydrate-transfer region 118b of the interior of the reactor 106.

Also shown in FIG. 1 is a first pump 120 coupled between the first fluid source 115 and the first valve 102. A first pressure gauge 124 may also be provided. Hydrate-forming fluid from the first fluid source 115 may be pressurized in the first pump 120 to obtain a desired pressure greater than a gas hydrate equilibrium pressure. The discharged gas pressure may be read by the first pressure gauge 124. The pressurized hydrate-forming fluid may then be provided from the first fluid source 115 to interior of the reactor 106 through the first valve 102. The interior of the reactor may be maintained at a temperature and pressure sufficient to dissolve the hydrate-forming fluid within the liquid solution retained therein.

Also shown in FIG. 1 is a second pump 126 (e.g., a double-piston liquid pump) and a reservoir 128 coupled to the second pump 126. The second pump 126 may be coupled to the second fluid source 116 and the reservoir 128 may be coupled to the second valve 104. A second pressure gauge 130 may also be provided. Reaction fluid from the second fluid source 116 may be pressurized within the reservoir 128 by the second pump 126. The pressure of the reaction fluid within the reservoir 128 may be read by the second pressure gauge 130. The pressurized reaction fluid may then be provided from the second fluid source 116 to the injector 108 via the second valve 104. In one embodiment, the injector 108 may be submerged within the liquid solution. Accordingly, the reaction fluid may be injected directly into the liquid solution retained within the interior of the reactor 106, wherein the hydrate-forming fluid is dissolved within the retained liquid solution. Upon injection, the reaction fluid reacts with the hydrate-forming fluid dissolved within the liquid solution retained within the hydrate-forming region 118a to form fine gas hydrate particles (e.g., snow-like) in a reverse micellar solution.

Gas hydrate particles formed within the hydrate-forming region 118a are moved (e.g., due to gravity) from the hydrate-forming region 118a into the hydrate-transfer region 118b, which is in fluid communication with the interior of the conduit 112. The moveable surface 114 then transports gas hydrate particles to the storage chamber 110. Thus, the moveable surface 114 is adapted to transfer gas hydrate particles, formed according to a reaction of the hydrate-forming fluid and reaction fluid within the liquid solution, from the hydrate-transfer region 118b to the storage chamber 110. Accordingly, the moveable surface 114 and the conduit 112 may be collectively characterized as being comprised within a gas hydrate removal system. In one embodiment, the moveable surface 114 may be provided as a screw-type conveyor. In one embodiment, the density of gas hydrate particles is higher than the liquid solution. Accordingly, the gas hydrate particles may settle down to the bottom of the reactor 106 and onto the moveable surface 114. In one embodiment, the liquid solution may be present within the portion of the conduit 112 that extends between the reactor 106 and the storage chamber 110 such that the gas hydrate particles are at least partly submerged within the liquid solution. By at least partially submerging the gas hydrate particles within the liquid solution as they are being transported by the moveable surface 114, the tendency of the gas hydrate particles to undesirably stick to the moveable surface 114 may be reduced. As illustrated, the conduit 112 is inclined upwards relative to the lower portion of the reactor 106 and, therefore, can be characterized as a riser. As described above, gas hydrate particles are transported from the reactor 106 to the storage chamber 110 within the same high pressure environment in which they were formed. Accordingly, providing the conduit 112 as a riser enables gas hydrate formation with a longer residence time than conventional batch reactors.

As also shown in FIG. 1, coolant streams 132 and 134 may be used to cool the moveable surface 114 down to a desired temperature. Similarly, coolant streams 136 and 138 may be used to cool the interior of the reactor 106 down to a desired temperature. Reactor temperature and pressure sensors 140 may be provided to send measurement signals via communication link 142 (e.g., wired or wireless) to a PC (not shown). The reactor 106 may further include a vent valve 144 installed at a top portion thereof to control the pressure within the interior of the reactor 106 (e.g., in emergency situations). A storage inlet valve 146 may be provided to separate process flows between the storage chamber 110 and the interior of the conduit 112. The storage chamber 110 may include a gas valve 148 to allow removal of dissociated gas from the gas hydrate particles and a first drain valve 150 to allow used reaction fluid and a small amount of liquid solution back to the reservoir 128. Lastly, a second drain valve 152 may be provided at a location suitable to facilitate draining of the reactor 106 and conduit 112, if necessary.

FIG. 2 schematically illustrates an exemplary configuration of the reactor 106 shown in FIG. 1.

Referring to FIG. 2, the reactor 106 may include, for example, a reactor body 202, a reactor cover 204 coupled to the reactor body 202, one or more view windows 206 coupled to the reactor body 202, and a coupling member 208 coupled to the reactor body 202. Also shown in FIG. 2 is a portion of the conduit 112. As illustrated, the coupling member 208 may couple the conduit 112 to the reactor 106. In one embodiment, view windows 206 allow a user to visually inspect the gas hydrate formation processes occurring within the reactor body 202. In one embodiment, three view windows, 45 degrees apart, may be coupled to the reactor body 202.

In one embodiment, the reactor body 202 may have a cylindrical, tapered-boot shape. In another embodiment, the reactor body 202 may be formed of any suitable material (e.g., stainless steel 316).

FIG. 3A schematically illustrates an exemplary configuration of the reactor cover 204 shown in FIG. 2. FIG. 3B illustrates a perspective view of the reactor cover shown in FIG. 3A.

Referring to FIGS. 3A and 3B, the reactor cover 204 may include, for example, first and second cover sections 302a and 302b adapted to be coupled to a portion (e.g., an upper portion) of the reactor body 202, first and second coupling units 304a and 304b adapted to couple the first cover section 302a to the second cover section 302b, and a reactor lid 306 fixed between the coupled first and second cover sections 302a and 302b. In one embodiment, a sealing member 308 (e.g., an O-ring) may further be provided to create a seal between the reactor lid 306 and the upper portion of the reactor body 202.

FIGS. 4A-4D illustrate one exemplary implementation of the reactor cover 204 shown in FIGS. 3A and 3B.

Figure 4A:
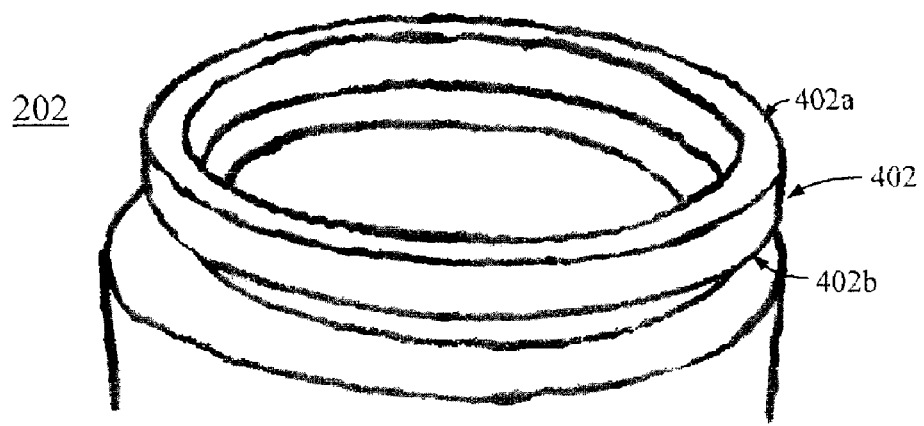
FIGS. 4A-4D illustrate one exemplary implementation of the reactor cover shown in FIGS. 3A and 3B.

Referring to FIG. 4A, an upper reactor body protrusion 402 (e.g., a flange extending around the perimeter of the reactor body 202) may be located at the upper portion of the reactor body 202. The upper reactor body protrusion 402 extends away from an exterior sidewall at the upper portion of the reactor body 202 to define an upper surface 402a and a lower surface 402b.

Figure 4B:
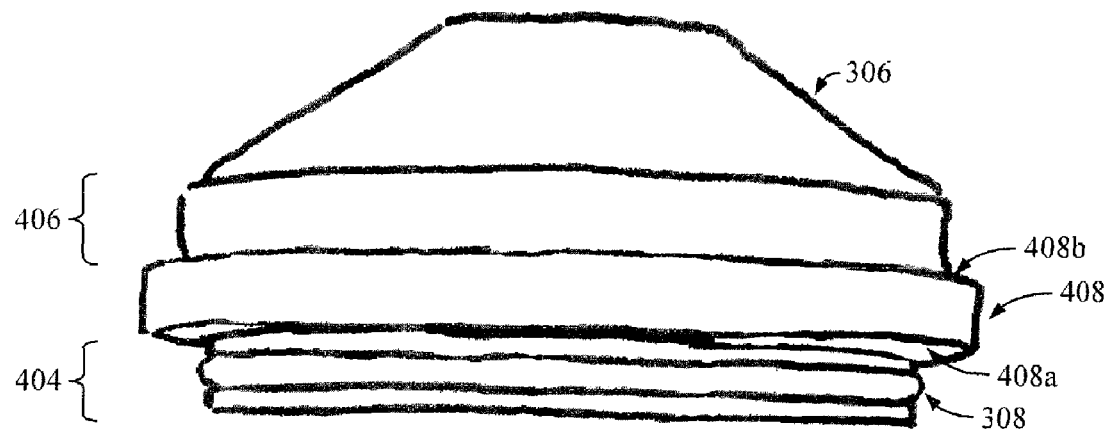

Referring to FIG. 4B, the reactor lid 306 includes a lower portion 404, an upper portion 406 and a reactor lid protrusion 408 (e.g., a flange extending around the perimeter of the reactor lid 306) between the lower and upper portions 404 and 406. As shown, the reactor lid protrusion 408 extends away from exterior sidewalls of the lower and upper portions 404 and 406 of the reactor lid 306 to define a lower surface 408a extending away from the lower portion 404 of the reactor lid 306 and define an upper surface 408b extending away from the upper portion 406 of the reactor lid 306. Lastly, the aforementioned sealing member 308 is coupled to the lower portion 404 of the reactor lid 306. In one embodiment, shape of the lower portion 404 of the reactor lid 306 corresponds to the shape of the interior of the reactor body 202 and is dimensioned such that the sealing member 308 contacts the interior of the reactor body 202 upon coupling the reactor cover 204 to the reactor body 202 to seal the interior of the reactor 106 from the external environment.

Figure 4C:
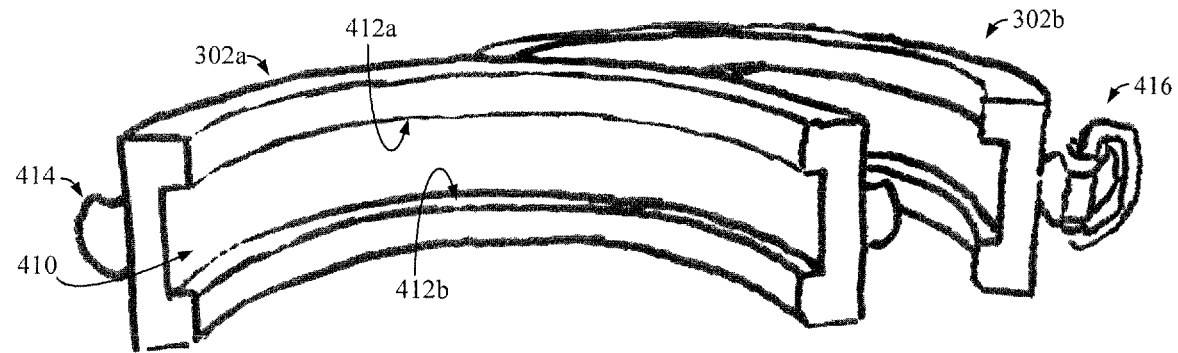

Referring to FIG. 4C, the aforementioned first and second cover sections 302a and 302b, respectively, may be provided in complementary, longitudinal shapes that are generally conformal with respective portions of the exterior sidewalls of the reactor lid 306 and the upper portion of the reactor body 202. In the illustrated embodiment, each of the first and second cover sections 302a and 302b, respectively, may further include a channel 410 adapted to receive the upper reactor body and reactor lid protrusions 402 and 408, respectively. In one embodiment, the channel 410 is at least partially defined by upper and lower surfaces 412a and 412b, respectively. The upper surface 412a may contact or press against the upper surface 408b of the reactor lid protrusion 408 upon coupling the reactor cover 204 to the reactor body 202. Similarly, the lower surface 412b may contact or press against the lower surface 402b of the upper reactor body protrusion 402 upon coupling the reactor cover 204 to the reactor body 202.

In one embodiment, each of the aforementioned first and second coupling units 304a and 304b may be provided as a draw pull latch assembly. For example, a draw pull latch may include a first member 410 (e.g., a strike) attached to one longitudinal end portion the first cover section 302a and a second member 412 (e.g., a latch) attached to a corresponding longitudinal end portion of the second cover section 304a. In the illustrated embodiment, a pair of first members 410 is attached to opposite longitudinal end portions of the first cover section 302a and a pair of second members 412 is attached to opposite longitudinal end portions of the second cover section 302b. It will be appreciated, however, that a first member 410 and a second member 412 may be attached to opposite longitudinal end portions of each cover section. Further, it will be appreciated that the first and second coupling units 304a and 304b may be provided as any mechanism suitable for coupling the first and second cover sections 302a and 302b together.

Figure 4D:
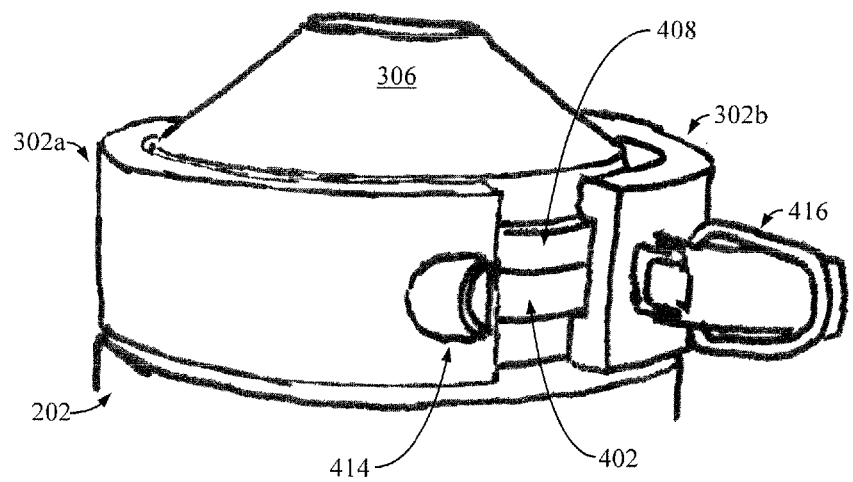

Referring to FIG. 4D, the reactor cover 204 may be coupled to the reactor body 202 by inserting the lower portion 404 of the reactor lid 306 into the interior of the reactor body 202. Upon insertion, the sealing member 308 contacts the interior of the reactor body 202 to facilitate sealing of the interior of the reactor 106 from the external environment. Additionally upon insertion, the lower surface 408a of the reactor lid protrusion 408 contacts or presses against the upper surface 402a of the upper reactor body protrusion 402. Next, the first and second first and second cover sections 302a and 302b may be placed on the exterior of the reactor lid 306 and reactor body 202 such that the upper reactor body and reactor lid protrusions 402 and 408 are disposed within the channels 410 of the first and second first and second cover sections 302a and 302b. Accordingly, the upper surfaces 412a of the first and second first and second cover sections 302a and 302b contact or press against the upper surface 408b of the reactor lid protrusion 408 and the lower surfaces 412b of the first and second first and second cover sections 302a and 302b contact or press against the lower surface 402b of the upper reactor body protrusion 402. Next, the first and second members 410 and 412 may be coupled to one another as is well known in the art, thereby coupling the first and second cover sections 302a and 302b together. Upon coupling the first and second cover sections 302a and 302b together, the reactor lid 306 is securely coupled to the reactor body 202.

When the first and second cover sections 302a and 302b are coupled via the first and second coupling units 304a and 304b, the reactor lid 306 can be reliably secured to the reactor body 202 without the use of screws or other complicated securing mechanism and may provide sufficient sealing under a pressure of up to about 250 bar and at a temperature down to about −30° C.

FIG. 5 schematically illustrates an exemplary configuration of a view window 206 shown in FIG. 2.

Referring to FIG. 5, each view window 206 may include, for example, a view window lid 502, a window sealing member 504 (e.g., a Teflon O-ring), an transparent panel 506 (e.g., tempered glass safe up to 210 bar) and a window coupling unit 508. The view window lid 502 may include a cavity 510 within which the window sealing member 504 and transparent panel 506 are disposed. In one embodiment, an end portion 512 of the view window lid 502 is adapted to be coupled to the reactor body 202 via the window coupling unit 508. For example, the end portion 512 of the view window lid 502 may be provided as a female-type screw adapted to be coupled to a male-type screw portion 514 of the window coupling unit 508. The window coupling unit 508 may be coupled to the reactor body 202 by any suitable means (e.g., by screwing the window coupling unit 508 into a fitting attached to the reactor body 202). Further, a sealing member 516 (e.g., an O-ring) may be provided between the transparent panel 506 and the male-type screw portion 514 to facilitate sealing between the transparent panel 506 and the window coupling unit 508.

FIG. 6 schematically illustrates an exemplary configuration of the conduit 112 and moveable surface 114 shown in FIG. 2, and structures associated therewith.

Referring to FIG. 6, the conduit 112 may include, for example a first conduit section 602 and a second conduit section 604. The first conduit section 602 may be coupled to the reactor body 202 via the coupling member 208 such that an interior of the conduit 112 is in fluid communication with the hydrate-transfer region 118b of the interior of the reactor 106. Reference numeral 606 represents the path along which gas-hydrate particles, formed within the reactor 106, move out of the reactor 106 into the interior of the first conduit section 602 (e.g., due to gravity), and through the second conduit section 604 due to movement of the moveable surface 114. The moveable surface 114 may be provided by a screw-type conveyor coupled to a drive motor 608 provided within a motor housing 610. The motor housing 610 may be coupled to the second conduit section 604 by any suitable means (e.g., by a screw flange 612). In one embodiment, an exemplary screw flange 612 can provide sufficient sealing up to a pressure of 1750 psi (about 120 bar) while the drive motor rotates the moveable surface 114 at about 10 to about 50 RPM. The moveable surface 114 transports the gas hydrate particles through the second conduit section 604 and through an outlet 614 that is coupled to the storage chamber 110 (e.g., via storage inlet valve 146).

As also shown in FIG. 6, two view windows 616 and 618 may be provided to facilitate visual observation of gas hydrate particles being transported by the moveable surface 114. In one embodiment, the view windows 616 and 618 may be provided as described above with respect to view windows 206.

FIG. 7A schematically illustrates one exemplary configuration of a lower portion of the reactor body 202 adapted to be coupled to the conduit 112 shown in FIGS. 2 and 6. FIG. 7B schematically illustrates an exemplary manner in which the lower portion of the reactor body 202 is coupled to the conduit 112.

Referring to FIG. 7A, a lower reactor body protrusion 702 (e.g., a flange extending around the perimeter of the reactor body 202) is located at a lower portion of the reactor body 202. The lower reactor body protrusion 702 is separated from an end portion of the lower portion of the reactor body 202 by a predetermined distance and extends away from an exterior sidewall at the lower portion of the reactor body 202 to define an upper surface 702a and a lower surface 702b.

Referring to FIG. 7B, a conduit protrusion 704 is located on the exterior sidewall of the first conduit section 602 at a predetermined distance away from the end of the first conduit section 602. In one embodiment, the conduit protrusion 704 may be similar to the upper reactor body reactor protrusion 402 described above with respect to FIG. 4A. Accordingly, the conduit protrusion 704 may be provided as a flange extending around the exterior perimeter of the first conduit section 602 and extend away from the exterior sidewall of the first conduit section 602 to define opposing surfaces that extend away from the exterior sidewall of the first conduit section 602. A sealing member 706 (e.g., an O-ring) may be coupled to an interior portion of the first conduit section 602 to facilitate sealing between the lower portion of the reactor body 202 and the first conduit section 602.

Also shown in FIG. 7B are first and second conduit coupling sections 708a and 708b, respectively, and first and second conduit coupling units 710a and 710b, respectively. The first and second conduit coupling sections 708a and 708b may be similar to the first and second cover sections 302a and 302b and may, thus, be provided as similarly described with respect to FIGS. 3 and 4C. In this case, however, channels within the first and second conduit coupling sections 708a and 708b may be adapted to receive the lower reactor body protrusion 702 and conduit protrusion 704. The first and second conduit coupling units 710a and 710b may be similar to the first and second coupling units 304a and 304b and may, thus, be provided as similarly described with respect to FIGS. 3 and 4C.

Provided as constructed above, the lower portion of the reactor body 202 may be coupled to the first conduit section 602 in a manner as described above with respect to FIG. 4D. For example, the reactor body 202 may be coupled to the conduit 112 by inserting the lower portion of the reactor body 202 into the first conduit section 602. Upon insertion, the sealing member 706 contacts the exterior surface of the lower portion of the reactor body 202 to facilitate sealing of the interior of the reactor 106 and conduit 112 from the external environment. Additionally upon insertion, one of the surfaces of the conduit protrusion 704 (i.e., the surface of the conduit protrusion 704 closest to the end of the first conduit section 602) contacts or presses against the lower surface 702b of the lower reactor body protrusion 702. Next, the first and second first and second conduit coupling sections 708a and 708b may be placed on the exterior of the lower portion of the reactor body 202 and the first conduit section 602 such that the lower reactor body protrusion 702 and the conduit protrusion 704 are disposed within the channels of the first and second first and second conduit coupling sections 708a and 708b. Accordingly, upper surfaces of the channels within the first and second first and second conduit coupling sections 708a and 708b contact or press against the upper surface 702a of the lower reactor body protrusion 702 and lower surfaces of the channels within the first and second first and second conduit coupling sections 708a and 708b contact or press against another surface of the conduit protrusion 704. Next, the first and second conduit coupling units 710a and 710b may be coupled to one another as is well known in the art, thereby coupling the first and second conduit coupling sections 708a and 708b together. Upon coupling the first and second conduit coupling sections 708a and 708b together, the first conduit section 602 is securely coupled to the reactor body 202.

Comparative methods of forming gas hydrates were performed using the system described above. In a first comparative method, high purity methane gas (i.e., 99.9 mol %) was provided to the reactor 106 as the hydrate-forming fluid. An aqueous surfactant (diisooctyl sodium sulfosuccinate) solution with a concentration of 0.001M to 0.1 M was continuously injected as the reaction fluid into the interior of the reactor 106. The holdup of bulk phase iso-octane (i.e., the liquid solution) was determined to take 47% of total reactor volume and the rest of the volume was occupied by methane gas. Because the water injection rate is very small (0.0769 l/min) compared to the iso-octane holdup (33 l), the methane gas was totally converted into methane hydrates. The residence time of water is large (7 hr) enough to have the complete conversion. A summary of process operations and results of the first comparative method are shown below in Table 1.

TABLE 1

| | |
|---|---|
| Reactor pressure (bar) | 45.6 |
| Reactor liquid temperature (C.) | −1.21 |
| Reactor total volume (l) | 70 |
| Iso-octane holdup (l) | 33 |
| Water injection rate (ml/min) | 76.9 |
| Methane feed rate (g/min) | 7.89 |
| Methane hydrate conversion (%) | 100 |
| Screw conveyor speed (rpm) | 20 |
| Methane storage density (wt %) | 10.26 |

In a second comparative method, natural gas (95.5% methane, 3% ethane and 1.5% propane) was provided to the reactor 106 as the hydrate-forming fluid. The results for continuous natural gas hydrate formation are shown in Table 2. Operating conditions are almost the same as in the first comparative method except for AOT solution concentration. Here, the concentration of AOT aqueous solution was 0.01M.

TABLE 2

| | |
|---|---|
| Reactor pressure (bar) | 59.6 |
| Reactor liquid temperature (C.) | −1.5 |
| Reactor total volume (l) | 70 |
| Iso-octane holdup (l) | 33 |
| AOT solution concentration (M) | 0.01 |
| AOT solution injection rate (ml/min) | 77.0 |
| Water injection rate (ml/min) | 77.0 |
| Natural gas feed rate (g/min) | 8.2 |
| Natural gas hydrate production rate (g/min) | 85.2 |
| Screw conveyor speed (rpm) | 20 |
| Natural gas storage density (wt %) | 9.62 |

In a third comparative method, natural gas (95.5% methane, 3% ethane and 1.5% propane) was provided to the reactor 106 as the hydrate-forming fluid. The results for continuous natural gas hydrate formation are shown in Table 3. Operating conditions are almost the same as in the first and second comparative methods except for the use of SDS solution (0.01M) as the reaction fluid. Natural gas hydrate production in the third comparative method is lower than the first and second comparative methods but the storage density was slightly increased over that of the first and second comparative methods.

TABLE 3

| | |
|---|---|
| Reactor pressure (bar) | 55.5 |
| Reactor liquid temperature (C.) | −2.1 |
| Reactor total volume (l) | 70 |
| Iso-octane holdup (l) | 33 |
| SDS solution concentration (M) | 0.01 |
| SDS solution injection rate (ml/min) | 36.0 |
| Water injection rate (ml/min) | 36.0 |
| Natural gas feed rate (g/min) | 4.05 |
| Natural gas hydrate production rate (g/min) | 40.1 |
| Screw conveyor speed (rpm) | 20 |
| Natural gas storage density (wt %) | 10.1 |

While specific values for process variables are mentioned above, it will be appreciated that, at a given liquid temperature, the reactor pressure should be maintained to be above the hydrate formation equilibrium pressure. For example, at −1° C., methane hydrate formation pressure is around 26 bar. Accordingly, the methane gas pressure should be maintained above this equilibrium pressure within the reactor to form methane hydrates. In one embodiment, pressure within the reactor 106 may be maintained between about 45 to about 60 bar at a reactor temperature range of about 1° C. and about −3° C. In another embodiment, pressure within the reactor 106 may be maintained between about 55 to about 60 bar at a reactor temperature range of about −1° C. and about −3° C. At these pressures and temperatures, it has been found that gas hydrate particles form immediately upon injection of the reaction fluid. In one embodiment, about 33 liters of liquid solution may be retained within the interior of the reactor 106 upon providing the hydrate-forming fluid into the reactor 106 at a rate of about 3-10 g/min and injecting reaction fluid into the reactor 106 at a rate of about 30-100 ml/min.

Moreover, it will be appreciated that process variables such as reactor pressure and temperature may be adjusted thermodynamically control the size of the gas hydrate particles to be smaller than a few microns.

As mentioned above with respect to the first to third comparative methods, water was injected into the reactor 106. In one embodiment, the water can be injected into the reactor 106 via any suitable means (e.g., via the use of a double-piston liquid pump).

In one embodiment, the liquid solution may be introduced into the reactor 106 before at initial startup of the reactor 106 (i.e., before the hydrate-forming and reaction fluids are introduced into the interior of the reactor 106. In another embodiment, the liquid solution may be introduced into the interior of the reactor 106 from a liquid solution source (not shown) connected to the second pump 126. In another embodiment, liquid solution within the interior of the reactor 106 may be replenished using a pump other than the first and second pumps 124 and 126.

In view of the embodiments exemplarily described above, a system for forming gas hydrates may be broadly characterized as including a reactor and a gas hydrate removal system coupled to the reactor. The reactor is adapted to receive a hydrate-forming fluid and a reaction fluid and react the hydrate-forming and reaction fluids together within a reverse micellar solution to form gas hydrate particles and the gas hydrate removal system is adapted to receive the gas hydrate particles within the reverse micellar solution and transport the gas hydrate particles away from the reactor. Moreover, the gas hydrate removal system is adapted to transport gas hydrate particles away from the reactor concurrently with the formation of gas hydrate particles within the reactor. Accordingly, the system for forming gas hydrates can be characterized as a continuous reaction system in which gas hydrate particles may be continuously formed while the particles are being removed from the reactor.

Also in view of the embodiments exemplarily described above, a method of forming gas hydrates may be broadly characterized as forming gas hydrate particles within a reverse micellar solution retained by a reactor and transporting the gas hydrate particles away from the reactor concurrently while forming of gas hydrate particles.

While the present invention has been particularly shown and described with reference to the exemplary embodiments thereof, it will be understood by those skilled in the art that the foregoing and other changes in form and details may be made therein without departing from the spirit and scope of the present invention.

What is claimed is:

1. A system for forming gas hydrates, the system comprising:
    a first valve adapted to be coupled to a first fluid source containing a hydrate-forming fluid containing hydrate guest molecules;
    a second valve adapted to be coupled to a second fluid source containing a reaction fluid containing aqueous surfactant solutions;
    a reactor coupled to the first valve, an interior of the reactor comprising a hydrate-forming region and a hydrate-transfer region, wherein the interior of the reactor is in fluid communication with the first valve;
    an injector coupled to the second valve and located within the hydrate-forming region of the interior of the reactor;
    a storage chamber;
    a conduit coupled between the reactor and the storage chamber, wherein an interior of the conduit is in fluid communication with the hydrate-transfer region of the interior of the reactor; and
    a moveable surface within the interior of the conduit, wherein
    the hydrate-forming and hydrate-transfer regions of the interior of the reactor are adapted to retain an organic-phase liquid solution,
    the reactor is adapted to dissolve the hydrate-forming fluid within the organic-phase liquid solution,
    the injector is adapted to inject the reaction fluid containing aqueous surfactant solutions into the organic-phase liquid solution having the hydrate-forming fluid dissolved therein, and
    the movable surface is adapted to transfer gas hydrate particles formed according to a reaction of the hydrate-forming fluid and reaction fluid within the liquid solution from the hydrate-transfer region to the storage chamber
    wherein the conduit is inclined upwards relative to a lower portion of the reactor.

2. The system of claim 1, wherein the hydrate-forming region is above the hydrate-transfer region.

3. The system of claim 1, wherein the hydrate-forming fluid comprises at least one of methane, ethane, natural gas, and carbon dioxide.

4. The system of claim 1, wherein the reaction fluid comprises at least one of diisooctyl sodium sulfosuccinate and sodium dodecylsulfate aqueous solutions.

5. The system of claim 1, wherein the organic-phase liquid solution comprises iso-octane.

6. The system of claim 1, wherein the reactor comprises:
    a reactor body;
    a reactor cover coupled to the reactor body;
    at least one view window coupled to the reactor body; and
    a coupling member coupling the reactor body to the conduit.

7. The system of claim 6, wherein the reactor cover comprises:
    first and second cover sections adapted to be coupled to reactor body;
    first and second coupling units adapted to couple the first cover section to the second cover section; and
    a reactor lid between the first and second cover sections.

8. The system of claim 7, wherein the reactor cover further comprises sealing member between the reactor lid and the first and second cover sections.

9. The system of claim 6, wherein the at least one view window comprises:
    a view window lid adapted to be coupled to the reactor body; and
    a transparent panel between the view window lid and the reactor body.

10. The system of claim 9, wherein the at least one view window further comprises:
    a first sealing member between the view window lid and the window pane; and
    a second sealing member between the window pane and the reactor body.

11. The system of claim 6, wherein the coupling member comprises:
    first and second conduit coupling sections adapted to be coupled to the reactor body and the conduit;
    first and second conduit coupling units adapted to couple the first conduit coupling section to the second conduit coupling section; and
    a sealing member between the reactor body and the conduit.

12. The system of claim 1, further comprising motor coupled to the moveable surface, the motor adapted to move the moveable surface.

13. The system of claim 12, wherein the moveable surface comprises a screw blade within the conduit.

14. The system of claim 1, wherein the reactor comprises a tapered boot reactor.

15. A system for forming gas hydrates, the system comprising:
    a reactor adapted to receive a hydrate-forming fluid dissolved within an organic-phase liquid solution and a reaction fluid containing aqueous surfactant solutions and react the hydrate-forming and reaction fluids containing aqueous surfactant solutions within a reverse micellar solution to form gas hydrate particles; and
    a gas hydrate removal system coupled to the reactor, the gas hydrate removal system adapted to receive the gas hydrate particles within the reverse micellar solution and transport the gas hydrate particles away from the reactor,
    wherein the gas hydrate removal system is adapted to transport gas hydrate particles away from the reactor concurrently with the formation of gas hydrate particles within the reactor.

16. The system of claim 15, wherein the reactor is adapted to form gas hydrate particles at an upper portion thereof and the gas hydrate removal system is coupled to a lower portion of the reactor.

17. The system of claim 15, further comprising a storage chamber, wherein the gas hydrate removal system is further adapted to transport the gas hydrate particles to the storage tank.

18. A method of forming gas hydrates, the method comprising:
    forming gas hydrate particles within a reverse micellar solution retained by a reactor; and
    transporting the gas hydrate particles away from the reactor concurrently while forming of gas hydrate particles,
    wherein forming the gas hydrate particles comprises:
    introducing a hydrate-forming fluid dissolved within an organic-phase liquid solution and a reaction fluid containing aqueous surfactant solutions into the reactor; and
    reacting the hydrate-forming fluid and the reaction fluid within the reverse micellar solution.

19. The method of claim 18, further comprising:
    forming the gas hydrate particles within an upper portion of the reactor; and
    transporting the gas hydrate particles away from a lower portion of the reactor.

20. The system of claim 1, wherein the injector is submerged within the organic phase liquid solution.

* * * * *